US010845656B2

(12) United States Patent
Yokogawa

(10) Patent No.: US 10,845,656 B2
(45) Date of Patent: *Nov. 24, 2020

(54) DISPLAY DEVICE

(71) Applicant: Japan Display Inc., Minato-ku (JP)

(72) Inventor: Akira Yokogawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,151

(22) Filed: Jan. 8, 2020

(65) Prior Publication Data

US 2020/0142266 A1    May 7, 2020

Related U.S. Application Data

(63) Continuation of application No. 16/287,053, filed on Feb. 27, 2019, now Pat. No. 10,571,765, which is a
(Continued)

(30) Foreign Application Priority Data

May 16, 2014    (JP) .................................. 2014-102447

(51) Int. Cl.
*G02F 1/1362*    (2006.01)
*G02F 1/133*    (2006.01)
(Continued)

(52) U.S. Cl.
CPC ...... *G02F 1/136204* (2013.01); *G02F 1/1345* (2013.01); *G02F 1/13306* (2013.01);
(Continued)

(58) Field of Classification Search
CPC .............................................. G02F 1/136204
See application file for complete search history.

(56) References Cited

U.S. PATENT DOCUMENTS 5,373,377 A * 12/1994 Ogawa .............. G02F 1/136204
349/40
5,677,745 A * 10/1997 Kawano ............ G02F 1/136204
349/42
(Continued)

FOREIGN PATENT DOCUMENTS

JP          6-148688 A    5/1994
JP          7-104316 A    4/1995
(Continued)

OTHER PUBLICATIONS

Office Action issued in Japanese Patent Application No. 2014-102447 dated Mar. 20, 2018 with English Translation, 10 pages.

*Primary Examiner* — Sang V Nguyen
(74) *Attorney, Agent, or Firm* — Oblon, McClelland, Maier & Neustadt, L.L.P.

(57) ABSTRACT

According to one embodiment, a display device includes a first line extending in a first direction, an insulating layer covering the first line, a second line disposed on the insulating layer and extending in a second direction, and a drive circuit including an output line extending in the first direction and connected to the first line through a contact portion. The contact portion includes a first portion to which the first line is connected at a first position, and a second portion to which the output line is connected at a second position which is apart from the first position in the second direction, the second portion facing the first portion with the insulating layer interposed therebetween while being electrically connected to the first portion.

10 Claims, 6 Drawing Sheets

Related U.S. Application Data continuation of application No. 15/363,819, filed on Nov. 29, 2016, now Pat. No. 10,254,606, which is a continuation of application No. 14/708,582, filed on May 11, 2015, now Pat. No. 9,547,205.

(51) Int. Cl.
  *G02F 1/1333* (2006.01)
  *G02F 1/1345* (2006.01)

(52) U.S. Cl.
  CPC .... *G02F 1/13452* (2013.01); *G02F 1/133345* (2013.01); *G02F 1/136286* (2013.01); *G02F 2201/50* (2013.01)

(56) References Cited

U.S. PATENT DOCUMENTS

| | | | |
|---|---|---|---|
| 5,781,253 A * | 7/1998 | Koike | G02F 1/136204 349/139 |
| 2002/0027621 A1 | 3/2002 | Chae | |
| 2004/0027502 A1 | 2/2004 | Tanaka et al. | |
| 2004/0066637 A1 * | 4/2004 | Imai | G02F 1/136204 361/777 |
| 2005/0195338 A1 * | 9/2005 | Matsumoto | G02F 1/136204 349/40 |
| 2006/0012729 A1 | 1/2006 | Tanaka et al. | |
| 2006/0163579 A1 | 7/2006 | Takizawa et al. | |
| 2008/0165110 A1 * | 7/2008 | Kim | G11C 19/28 345/99 |
| 2009/0251834 A1 | 10/2009 | Kobashi | |
| 2009/0294771 A1 * | 12/2009 | Kim | G02F 1/136204 257/59 |
| 2010/0079425 A1 | 4/2010 | Yamazaki et al. | |
| 2010/0123869 A1 | 5/2010 | Itakura et al. | |
| 2010/0225831 A1 * | 9/2010 | Takeuchi | G02F 1/136213 348/739 |
| 2011/0187951 A1 * | 8/2011 | Yokogawa | G02F 1/133 349/33 |
| 2011/0316008 A1 * | 12/2011 | Yokogawa | G02F 1/13452 257/88 |
| 2012/0229712 A1 * | 9/2012 | Yoshida | G02F 1/1339 348/792 |
| 2013/0050173 A1 | 2/2013 | Koo | |
| 2013/0242511 A1 | 9/2013 | Ohishi | |
| 2014/0240631 A1 * | 8/2014 | Shishido | G02F 1/136204 349/43 |
| 2015/0102394 A1 | 4/2015 | Yoo et al. | |
| 2015/0194109 A1 | 7/2015 | Fujikawa | |

FOREIGN PATENT DOCUMENTS

| | | |
|---|---|---|
| JP | 8-234227 A | 9/1996 |
| JP | 2004-126276 | 4/2004 |
| JP | 2005-166763 A | 6/2005 |
| JP | 2008-176256 A | 7/2005 |
| KR | 10-2006-0072768 A | 6/2006 |
| KR | 10-2013-0121546 | 10/2013 |

* cited by examiner

DISPLAY DEVICE

CROSS-REFERENCE TO RELATED APPLICATIONS

This application is a continuation of U.S. application Ser. No. 16/287,053, filed Feb. 27, 2019, which is a continuation of U.S. application Ser. No. 15/363,819, filed Nov. 29, 2016, which is a continuation of U.S. application Ser. No. 14/708,582, filed May 11, 2015 and is based upon and claims the benefit of priority from Japanese Patent Application No. 2014-102447, filed May 16, 2014. The entire contents of each of the above-identified documents are incorporated herein by reference.

FIELD

Embodiments described herein relate generally to a display device.

BACKGROUND

Various types of display devices have been developed including a liquid crystal display device, and an organic electroluminescent display device. In these display devices, pixel electrodes provided with pixels individually, interconnections electrically connected to the pixel electrodes, and driving circuits used to drive the interconnections are disposed on the same substrate.

During the manufacturing process of such a display device, the substrate sometimes becomes electrostatically charged, and components of the driving circuit may be partly damaged by electrostatic discharge (ESD), and consequently, the driving circuit may malfunction. As a technique of preventing such destruction by the electrostatic discharge, a short ring is known which is connected to the driving circuit and the interconnection on the substrate.

According to an embodiment disclosed in the present application, provided is a display device which can be manufactured with improved productivity.

DETAILED DESCRIPTION

In general, according to one embodiment, a display device includes an insulating substrate, first line, insulating layer, second line, and drive circuit. The first line disposed above the insulating substrate and extends in a first direction, an insulating layer covering the first line. The insulating substrate covers the first line. The second line is disposed on the insulating layer and extends in a second direction which crosses the first direction. The drive circuit includes an output line extending in the first direction and connected to the first line through a contact portion and the drive circuit is configured to drive the first line through the output line. The contact portion includes a first portion to which the first line is connected at a first position, and a second portion to which the output line is connected at a second position which is apart from the first position in the second direction, the second portion facing the first portion with the insulating layer interposed therebetween while being electrically connected to the first portion.

Embodiments are described with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the description and Figures of the present application, structural elements having the same or similar functions will be referred to by the same reference numbers and detailed explanations of them that are considered redundant may be omitted.

In this embodiment, a display device is a liquid crystal display device. However, no limitation is intended thereby, and the display device may be any type of flat panel display devices including self-luminous display device such as an organic electroluminescent display device and the like, and electronic paper display device including electrophoretic elements and the like. Furthermore, the display device of the present embodiment can be used in various devices such as smartphone, tablet, mobile phone, notebook computer, game console, and car equipment.

First Embodiment

Figure 1:
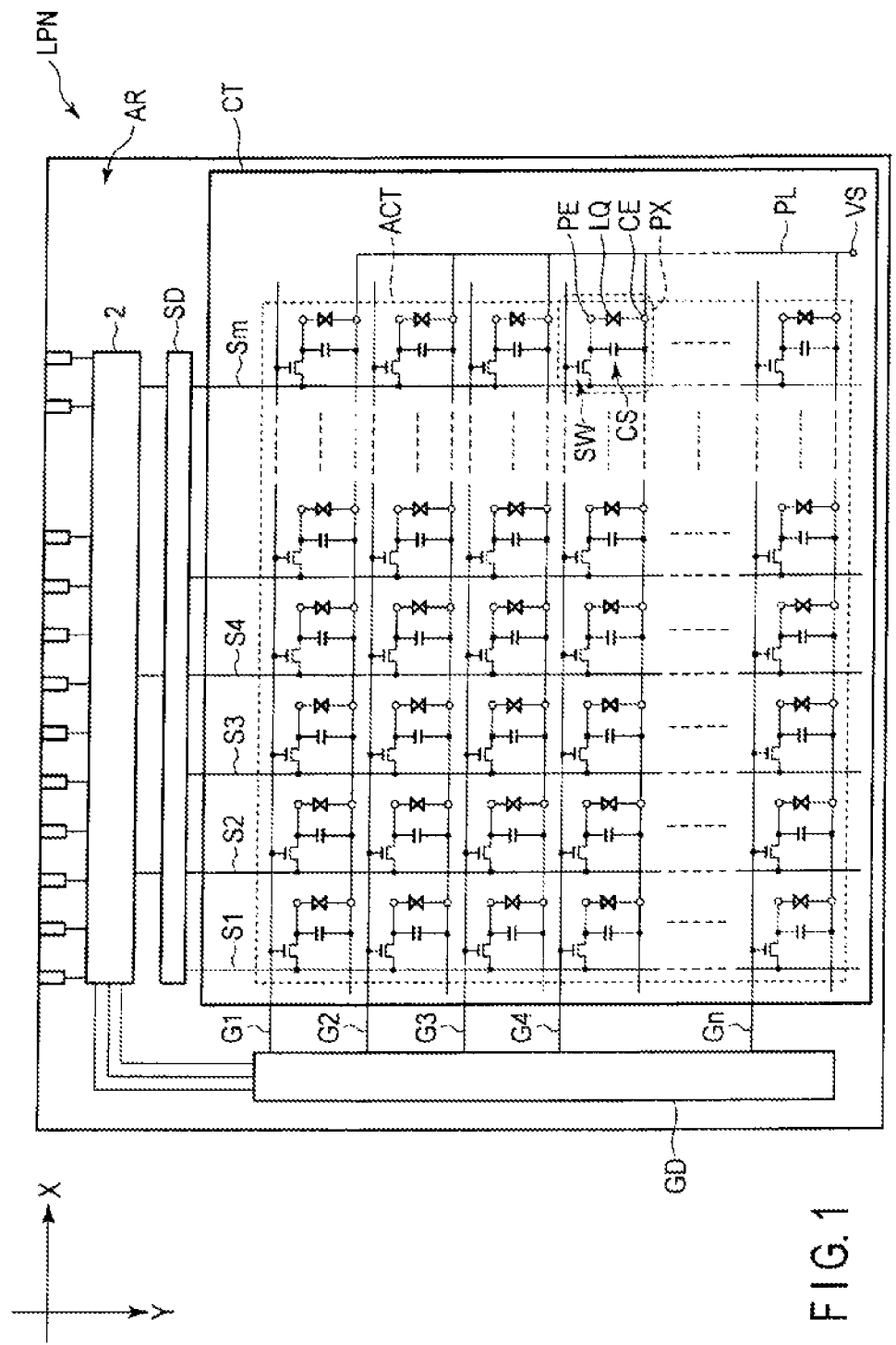
FIG. 1 schematically shows an equivalent circuit and structure of a display device of a first embodiment.

FIG. 1 is a view which schematically shows the equivalent circuit and the structure of a liquid crystal display device 1 of the present embodiment.

The liquid crystal display device 1 includes, for example, a liquid crystal display panel LPN of active matrix type.

The liquid crystal display panel LPN includes an array substrate AR (first substrate), countersubstrate CT (second substrate) disposed to be opposed to the array substrate AR, and liquid crystal layer LQ held between the array substrate AR and the countersubstrate CT. Furthermore, the liquid crystal display panel LPN includes an active area ACT which displays an image. The active area ACT includes a plurality of pixels PX arranged in an m×n matrix (m and n are positive integers).

The liquid crystal display panel LPN includes, within the active area ACT, a plurality of gate lines G (G1 to Gn) extending in a first direction X, a plurality of source lines S (S1 to Sm) extending in a second direction Y which is orthogonal to the first direction X, a plurality of pixels (pixel regions) PX, a switching element SW electrically connected to the gate line G and the source line S in each pixel PX, an island-shaped pixel electrode PE electrically connected to the switching element SW in each pixel PX, and a common electrode CE which forms a electric field with the pixel electrode PE.

Each gate line G is drawn outside the active area ACT and is connected to a gate driver (gate drive circuit) GD. Each source line S is drawn outside the active area ACT and is connected to a source driver (source drive circuit) SD. The common electrode CE is electrically connected to a power supply unit VS which supplies a common voltage via a power supply line PL.

In FIG. 1, the ends of the whole gate lines G1 to Gn at the source line S1 side are connected to the gate driver GD disposed along the edge at the source line S1 side outside the active area ACT. As another example, gate drivers GD may be disposed along both the edge at the source line S1 side and the edge at the source line Sm side outside the active area ACT. If this example is adopted, odd-numbered gate lines G arranged in the second direction Y may be connected to the one gate driver GD and even-numbered gate lines G may be connected to the other gate driver GD, for example.

The gate driver GD drives gate lines G one by one to have switching elements SW in each row (each group of pixels PX aligned in the first direction X) conduct. The source driver SD outputs an image signal or a non-image signal to each source line S in a period when each switching element SW conducts by the drive of the gate line G, for example.

The gate driver GD and the source driver SD are at least partly formed on the array substrate AR as internal circuits and are connected to a driver IC chip 2. In the example depicted, the driver IC chip 2 used as a signal source necessary to drive the liquid crystal display panel LPN is mounted on the array substrate AR outside the active area ACT of the liquid crystal display panel LPN.

Now, the structure of the array substrate AR is explained.

Figure 2:
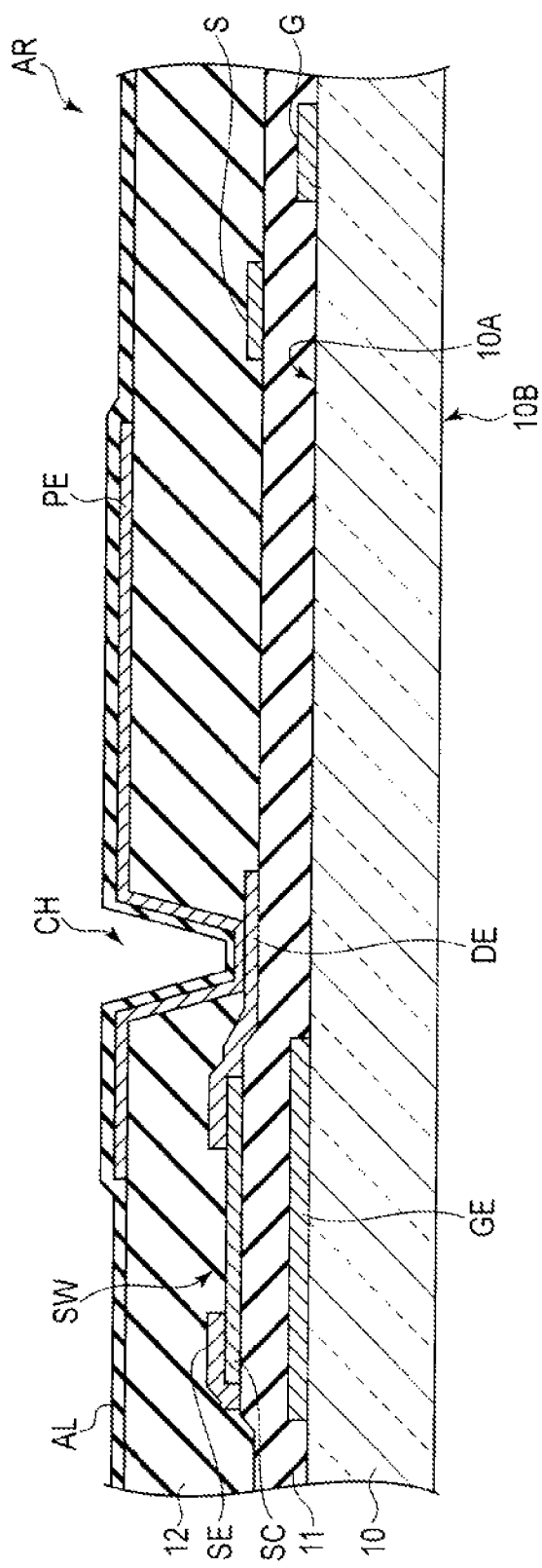
FIG. 2 shows a structural example of an array substrate of the display device.

FIG. 2 is an example of the structure of the array substrate AR. In the example, a cross-sectional view of the array substrate AR corresponding to a single pixel PX is depicted.

The array substrate AR includes a light transmissive insulating substrate 10 such as a glass substrate or a resin substrate. Furthermore, the array substrate AR includes, at the first main surface 10A side of the insulating substrate 10, a first insulating layer 11, a second insulating layer 12, the gate line G, the source line S, the switching element SW, the pixel electrode PE, and an alignment film AL. The switching element SW includes a semiconductor layer SC, a first electrode GE, a second electrode SE, and a third electrode DE. The first electrode GE, second electrode SE, and third electrode DE may be referred to as gate electrode, source electrode, and drain electrode, respectively.

The first electrode GE and the gate line G are formed integrally, for example, and both disposed on the first main surface 10A of the insulating substrate 10. The first electrode GE and the gate line G are formed of a metal such as molybdenum, tungsten, aluminum, titanium, and copper or an alloy containing such a metal. In this example, the first electrode GE and the gate line G are formed of MoW.

The first insulating layer 11 is disposed on the first electrode GE, the gate line G, and the first main surface 10A of the insulating substrate 10. The first insulating layer 11 is formed of, for example, silicon oxide (SiO) and silicon nitride (SiNx).

The semiconductor layer SC is formed on the first insulating layer 11 in an island shape. The semiconductor layer SC is formed of, for example, amorphous silicon (a-Si). Note that the semiconductor layer SC may be formed of other materials such as polycrystalline silicon (p-Si) and oxide semiconductor.

The second electrode SE and the third electrode DE are disposed on the semiconductor layer SC. The second electrode SE and the third electrode DE partly extend onto the first insulating layer 11. The source line S is disposed on the first insulating layer 11. The second electrode SE and the source line S are formed integrally, for example. The second electrode SE, the third electrode DE, and the source line S are formed of the same material used for the first electrode GE, for example. For example, the second electrode SE, third electrode DE, and source line S are formed of a multilayer of titanium and aluminum.

The second insulating layer 12 is disposed on the second electrode SE, the third electrode DE, the source line S, the semiconductor layer SC, and the first insulating layer 11. The second insulating layer 12 is formed of, for example, silicon nitride (SiNx). Furthermore, the second insulating layer 12 may contain an organic insulating film formed of a resin material.

The pixel electrode PE is disposed on the second insulating layer 12. The pixel electrode PE contacts the third electrode DE through a contact hole CH provided with the second insulating layer 12. The pixel electrode PE may be formed of a transparent conductive material such as indium tin oxide (ITO) or indium zinc oxide (IZO) or may be formed of a metal such as aluminum.

The alignment film AL is disposed on the pixel electrode PE and the second insulating layer 12. On the countersubstrate CT, an alignment film facing the alignment film AL of the array substrate AR is formed, and the liquid crystal layer LQ is filled between these alignment films.

In FIG. 2, the switching element SW is of bottom- and single-gate type switching element. The switching element SW may be of top-gate type or double-gate type instead.

If switching of the liquid crystal molecules in the liquid crystal layer LQ is performed in a mode using vertical fields such as twisted nematic (TN) mode and vertical aligned (VA) mode, the common electrode CE is disposed on the countersubstrate CT. Furthermore, if switching of the liquid crystal molecules is performed in a mode using transverse fields (including fringe field) such as in-plane switching mode, the common electrode CE is disposed on the array substrate AR. At that time, the common electrode CE is disposed, for example, to face the pixel electrode PE with the insulating layer interposed therebetween. Or, the common electrode CE is disposed on the same plane (XY plane) on which the pixel electrode PE is also disposed.

The liquid crystal display panel LPN with the above structure can be applied to a transmissive liquid crystal display device or a reflective liquid crystal display device. If the liquid crystal display panel LPN is applied to a transmissive type liquid crystal display device, the panel displays images by switching its liquid crystal molecules to selectively transmit light from a backlight at the second main surface 10B side of the insulating substrate 10. If the liquid crystal display panel LPN is applied to a reflective type liquid crystal display device, the panel displays images by switching its liquid crystal molecules to selectively reflect external light from the countersubstrate CT side to be incident thereupon. The liquid crystal display device may include both functions of reflective type and transmissive type.

The gate driver GD and the source driver SD shown in FIG. 1 are formed at the same time through the manufacturing process of each component of the array substrate AR disposed on the active area ACT. In such a manufacturing process, electrostatic energy is generated because of a contact, friction, and exfoliation between the insulating substrate 10 and various manufacturing apparatuses and conveying mechanisms or because of a plasma treatment such as plasma chemical vapor deposition (CVD) and plasma etching, and the electrostatic energy tends to be charged on the insulating substrate 10 and lines and electrodes in a floating state. Consequently, in the manufacturing process, ESD occurs between the lines of the gate driver GD and the gate driver GD may malfunction.

Figure 3:
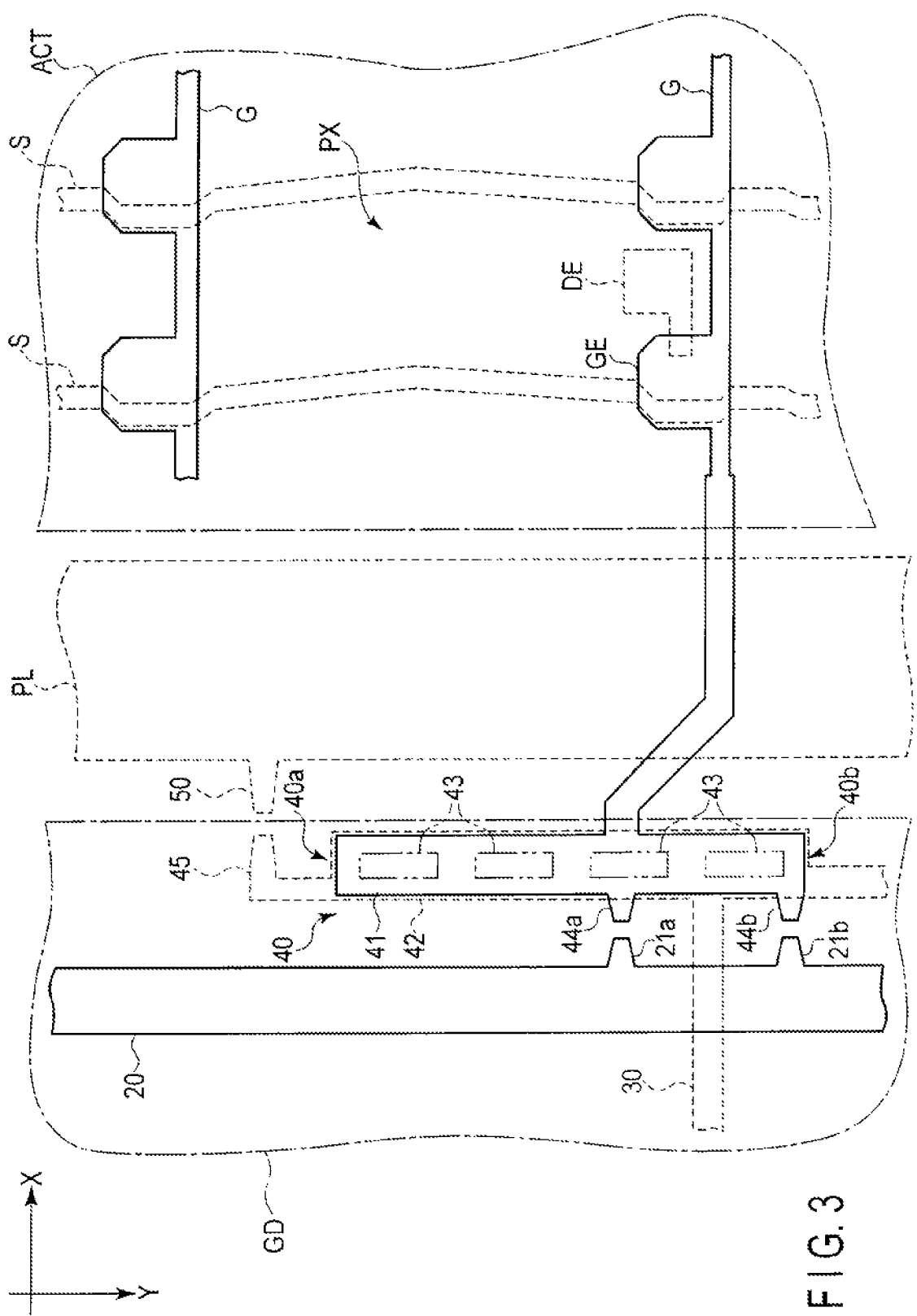
FIG. 3 schematically shows a boundary territory between a gate driver and an active area disposed on the array substrate.

Hereinafter, an example of the structure to prevent such a malfunction in the gate driver GD is explained. FIG. 3 is a plan view which schematically shows the proximity of the boundary between the gate driver GD and the active area ACT. In this figure, two gate lines G aligned in the second direction Y and the components manufactured with the gate lines G through the same process at the same time are all depicted in solid lines. On the other hand, two source lines S aligned in the first direction X at the end of the active area ACT adjacent to the gate driver GD and components manufactured with the source lines S through the same process at the same time are all depicted in broken lines.

The components depicted in solid lines including the gate lines G are prepared by, for example, forming a conductive film such as MoW on the first main surface 10A of the insulating substrate 10 by sputtering and patterning the conductive film. The components depicted in broken lines including the source lines S are prepared by, for example, forming a conductive film on the first insulating layer 11 and the semiconductor layer SC by sputtering and patterning the conductive film.

Within the active area ACT, the source lines S extend parallel to one another along the second direction Y and the gate lines G extend parallel to one another along the first direction X. In FIG. 3, the source lines S extend bending and the gate lines G extend linearly. The region surrounded by the source lines S and the gate lines G corresponds to a single pixel PX. Hereinafter, the structure is explained with reference to this pixel PX. The other pixels PX in the liquid crystal display panel LPN have the same structure as in FIG. 3.

In the example depicted, the first electrode GE of the switching element SW in the pixel PX is formed integrally with the gate lines G. The first electrode GE faces a part of the source lines S and a part of the third electrode DE with the first insulating layer 11 interposed therebetween. The third electrode DE is formed in an island shape within the pixel PX and is connected to the pixel electrode PE shown in FIG. 2.

The gate lines G extend to the gate driver GD passing over the power supply line PL disposed along the outer periphery of the active area ACT, for example. The power supply line PL is formed with the source lines S through the same manufacturing process at the same time.

The gate driver GD includes, at the active area ACT side, a circuit line 20, output line 30, and contact portion 40. In addition to the above, the gate driver GD includes a number of interconnections (circuit lines, input line, and output lines), contact portions, capacitances, and switching elements.

In FIG. 3, the circuit line 20 extends linearly in the second direction Y. Furthermore, the output line 30 extends linearly in the first direction X.

The contact portion 40 includes a first portion 41 and a second portion 42. The first portion 41 is formed integrally with the gate lines G. The second portion 42 is formed integrally with the output line 30. The first portion 41 and the second portion 42 face each other with the first insulating layer 11 interposed therebetween, and they extend in the second direction Y in a stripe shape between a first edge 40a and a second edge 40b of the contact portion 40. The first portion 41 and the second portion 42 are electrically connected to each other through one or more (four in the example depicted) contact holes 43 provided with the first insulating layer 11. The gate driver GD supplies a drive signal (drive voltage) to the gate lines G via the output line 30, second portion 42, and first portion 41.

The circuit line 20 and the first portion 41 are formed with the gate lines G through the same manufacturing process at the same time. The output line 30 and the second portion 42 are formed with the source lines S in the same manufacturing process at the same time.

The first portion 41 has protrusions 44 (44a, 44b) at its edge facing the circuit line 20 which are protruding to the circuit line 20. The circuit line 20 has protrusions 21 (21a, 21b) at its edge facing the first portion 41 which are protruding to the first portion 41. On the XY plane, the tips of protrusions 44a and 21a face each other and the tips of protrusions 44b and 21b face each other.

Furthermore, the second portion 42 has a protrusion 45 at its edge crossing the second direction Y which is protruding to the power supply line PL in an L-shape. The power supply line PL has a protrusion 50 at its edge facing the second portion 42 which is protruding to the tip of protrusion 45. The tips of protrusions 45 and 50 face each other on the XY plane.

Figure 4:
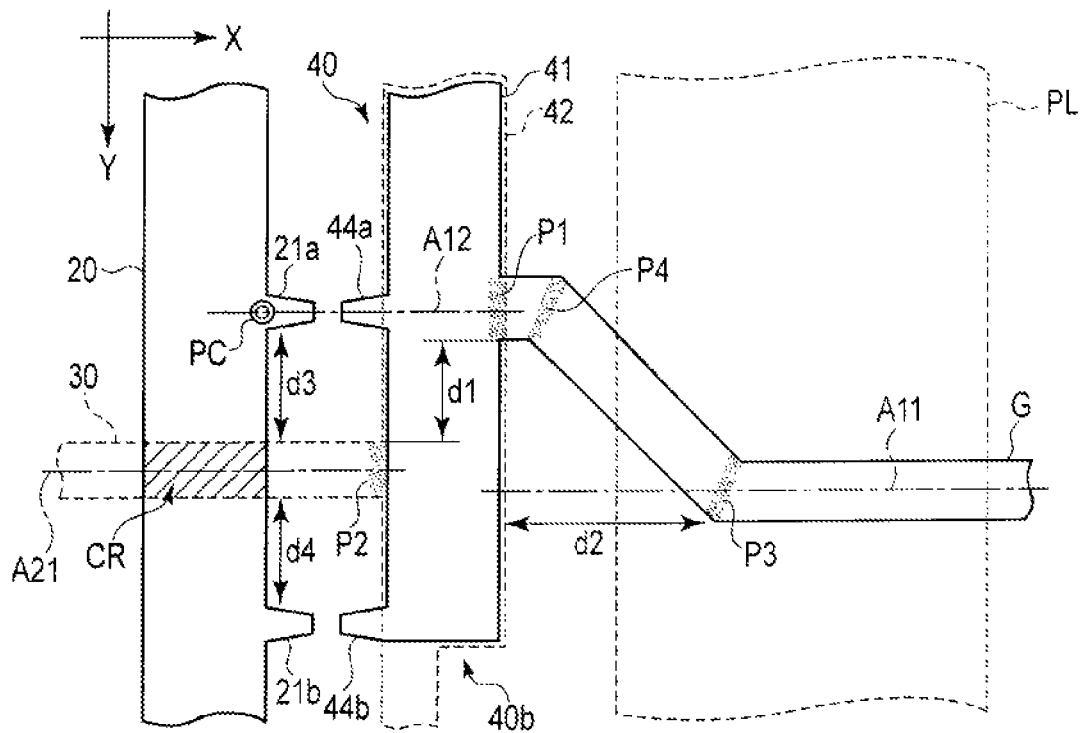
FIG. 4 shows a joint part of gate line, output line, and contact portion shown in FIG. 3 in an enlarged manner.

FIG. 4 shows a joint part of the gate line G, output line 30, and contact portion 40 those are shown in FIG. 3 in an enlarged manner. The gate line G extends along an axis A11 which is parallel to the first direction X in the active area ACT, and is connected to the edge of the first portion 41 at the power supply line PL side at a first position P1 which is apart in the second direction Y from axis A11. In the example of FIG. 4, the first position P1 is apart from axis A11 toward the first edge 40a of the contact portion 40 (toward the upper side of FIG. 4).

The output line 30 extends along an axis A21 which is parallel to the first direction X inside the gate driver GD and is connected to the edge at the circuit line 20 side of the second portion 42 in a second position P2 which is apart in the second direction Y from the first position P1 by a distance d1.

In the example of FIG. 4, the gate line G extends along axis A11 to the first portion 41 from the active area ACT side, bends clockwise at a third position P3 which is near the first portion 41 to form an acute angle with axis A11, and extends to the first position P1 again bending at a fourth position P4. The third position P3 is apart in the first direction X from the edge of the first portion 41 at the power supply line PL side by a distance d2.

On the other hand, in the example of FIG. 4, the output line 30 extends to the second position P2 which is near the second portion 42 without bending. Specifically, the output line 30 crosses the circuit line 20 substantially perpendicularly, and extends to pass between protrusions 21a and 44a and protrusions 21b and 44b to be connected to the second portion 42 at the second position P2. Protrusions 21a and 44a are apart in the second direction Y by distance d3 from a crossing region CR in which the output line 30 and the circuit line 20 cross. Furthermore, protrusions 21b and 44b are apart in the second direction Y by distance d4 from the crossing region CR.

In the example of FIG. 4, protrusions 21a and 44a are provided with a line continuous from an axis A12 of the gate line G which extends between the first position P1 and the fourth position P4, and axis A12 is parallel to the first direction X. Therefore, distances d1 and d3 basically match. Protrusions 21*b* and 44*b* are provided with the end of the first portion 41 in the second direction Y (lower end in FIG. 4).

With the structure explained above, malfunctions of the gate driver GD caused by ESD can be prevented. This effect will be explained with reference to FIGS. 3, 4, and 5 to 8.

Figure 5:
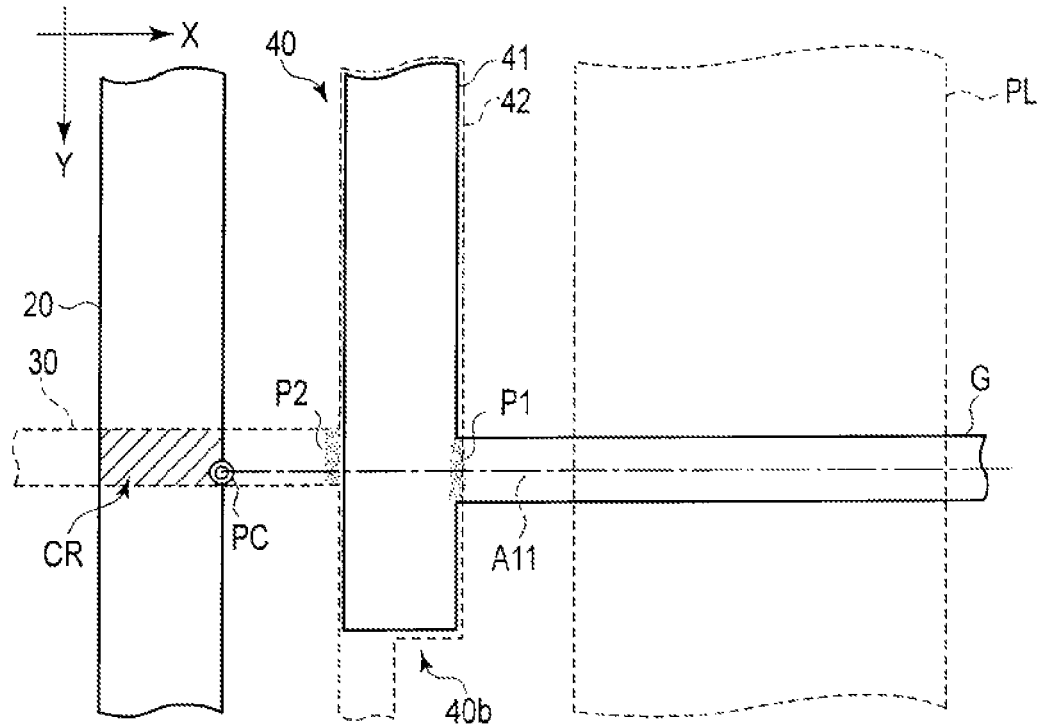
FIG. 5 shows a comparative example of the embodiment.

FIG. 5 shows a comparative example of the present embodiment, in which a joint part of the gate line G, the output line 30, and the contact portion 40 is shown in an enlarged manner as in FIG. 4. In FIG. 5, the gate line G extends linearly along axis A11 which is parallel to the first direction X inside the active area ACT, and is connected to the first portion 41 at the first position P1 without bending.

If an insulating substrate 10 or the like becomes electrostatically charged in a manufacturing process of an array substrate AR, an electrostatic current runs through the gate line G to reach the first portion 41 and will cause electrostatic destruction (ESD) between a first portion 41 and a circuit line 20. Generally, such ESD easily occurs in the shortest current path between the gate line G and the circuit line 20, that is, in the proximity of a position PC where a line continuously extending from an axis A11 of the gate line G and the circuit line 20 cross.

In the example of FIG. 5, the output line 30 and the gate line G basically extend along the same straight line. Therefore, the position PC above is in the proximity of a crossing region CR. A possible malfunction in this case will be explained with reference to FIGS. 6 to 8.

Figure 6:
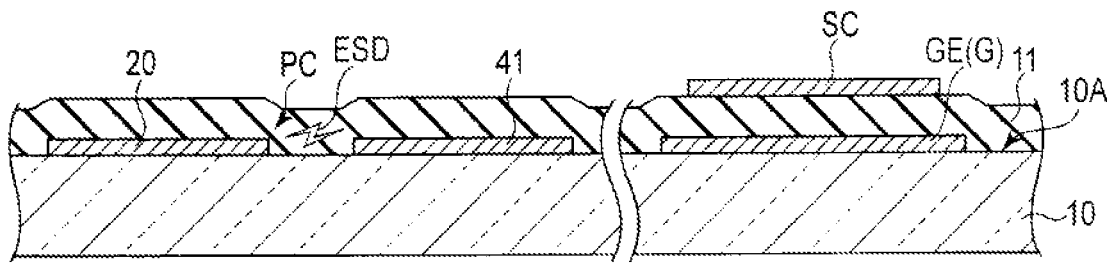
FIG. 6 exemplifies a possible malfunction caused by ESD.
Figure 7:
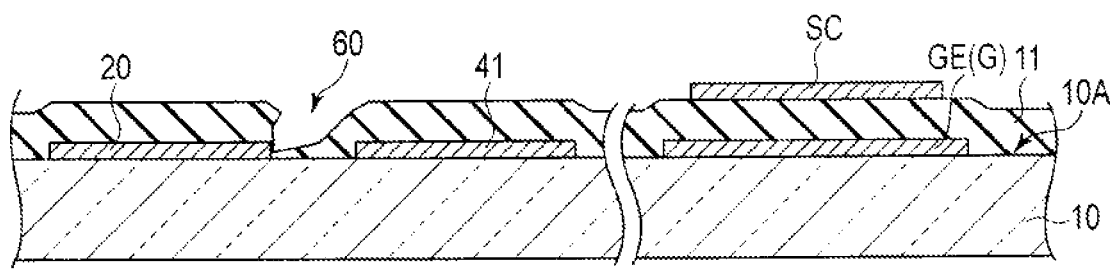
FIG. 7 exemplifies the possible malfunction caused by ESD.
Figure 8:
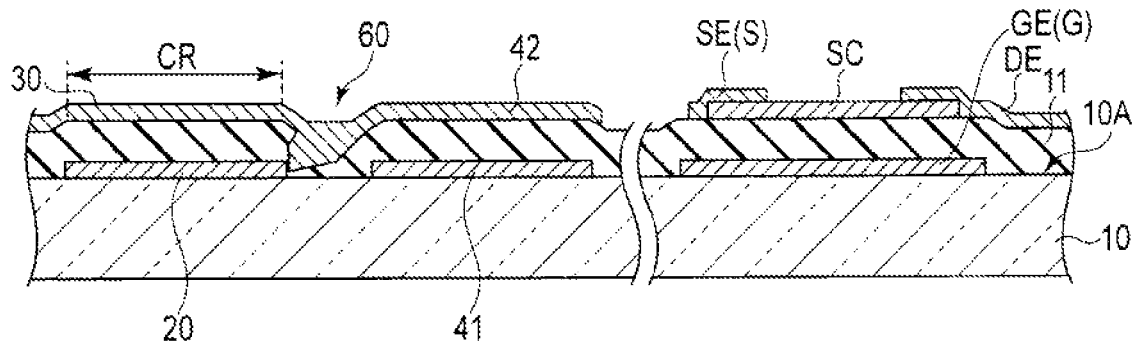
FIG. 8 exemplifies the possible malfunction caused by ESD.

FIG. 6 is a cross-sectional view which schematically shows that a first electrode GE (gate line G), the circuit line 20, the first portion 41, the first insulating layer 11, and the semiconductor layer SC are formed on the first main surface 10A of the insulating substrate 10 in the manufacturing process of the array substrate AR. In the example depicted, if ESD occurs in the proximity of the position PC, the first insulating layer 11 between the first portion 41 and the circuit line 20 is damaged, and as in FIG. 7, a damage hole 60 may be produced, partly exposing the circuit line 20. If the second electrode SE (source line S), the third electrode DE, and the output line 30 are formed as in FIG. 8 after the damage hole 60 is produced, the circuit line 20 and the output line 30 which should normally be insulated from each other are short-circuited through the damage hole 60. As can be understood from the above, a malfunction in the gate driver GD caused by ESD will be produced in the structure shown in FIG. 5.

In contrast, in the example of FIG. 4, ESD tends to occur in the shortest current path between the gate line G and the circuit line 20, that is, in the proximity of a position PC where a line continuously extended from axis A12 of the gate line G and the circuit line 20 cross. Note that, in the example of FIG. 4, the position PC is apart from the crossing region CR. Therefore, even if the first insulating layer 11 near the position PC is damaged by ESD, a malfunction such as a short-circuit between the circuit line 20 and the output line 30 does not easily occur.

In the example of FIG. 4, the first position P1 is apart from the second position P2 in the second direction Y by bending the gate line G. This structure can be adopted even if the output line 30 and the gate line G must be arranged on the same straight line extending in the first direction X because of design requirements (that is, even if a sufficient gap cannot be secured between axes A11 and A21 in the second direction Y).

Note that if distance d2 between the third position P3 and the first portion 41 is short, ESD may occur between the gate line G and the first portion 41 at the third position P3. The inventors of the present application have studied this point and verified that ESD does not easily occur if distance d2 is set greater than or equal to 15 µm, approximately. According to this verification, distance d2 should preferably be d2≥15 µm. For example, distance d2 is approximately 20 µm.

Furthermore, in the example of FIG. 4, a gap between the first portion 41 and the circuit line 20 becomes narrower at positions where protrusions 21*a* and 44*a* are provided and protrusions 21*b* and 44*b* are provided, and ESD tends to occur in these positions. That is, ESD can be generated by design at positions which do not affect the crossing region CR only by adjusting the positions of protrusions 21*a* and 44*a* and protrusions 21*b* and 44*b*.

Note that, according to the verification by the inventors of the present application, a malfunction caused by ESD scarcely occurs if the crossing region CR is apart from the position of ESD by 10 µm or more. That is, the damage of the first insulating layer 11 caused by ESD tends to occur within an approximately 10 µm radius range from the position of ESD, and ESD causes a very limited effect outside this range. Therefore, from this verification, distances d3 and d4 should preferably be d3, d4≥10 µm. For example, distance d3 is approximately 11.0 µm and distance d4 is approximately 11.5 µm.

The inventors prototyped liquid crystal display devices using the structure of FIG. 4 and liquid crystal display devices using the structure of FIG. 5 to evaluate a malfunction ratio in gate drivers GD caused by ESD in both devices. As a result, approximately 1.8% of the gate driver GD malfunctioned in the liquid crystal display devices using the structure of FIG. 5 while approximately 0.1% of the gate driver GD malfunctioned in the liquid crystal display device using the structure of FIG. 4. That is, the evaluation showed that the productivity can be improved by approximately 1.7% with the structure of FIG. 4. As can be understood from the above, the present embodiment can reduce or prevent the malfunction in the gate driver GD caused by ESD and can improve the productivity of the liquid crystal display device.

In addition to the above, various favorable effects can be obtained from the structure of the present embodiment.

Second Embodiment

The second embodiment is now explained. Unless otherwise specified, the structure and work of the embodiment are the same as those of the first embodiment.

Figure 9:
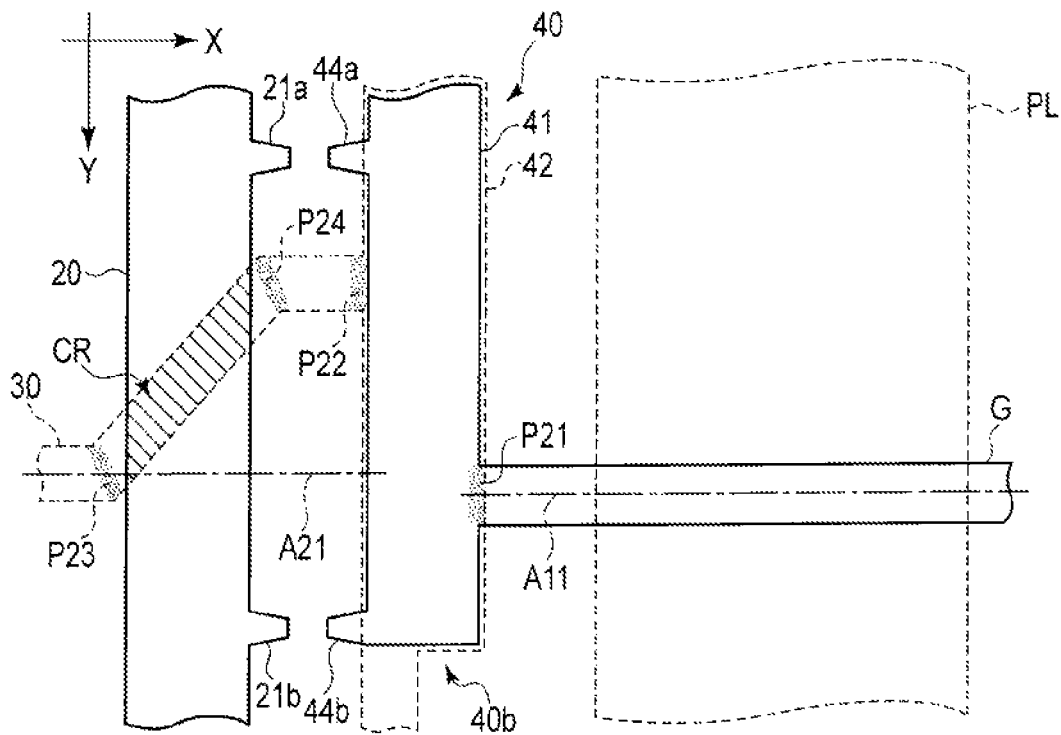
FIG. 9 shows a display device of a second embodiment.

FIG. 9 is a schematic view which shows a liquid crystal display device of the second embodiment and shows a joint part of a gate line G, output line 30, and contact portion 40 in an enlarged manner as in FIG. 4.

In the example of FIG. 9, a first position P21 where the gate line G and the first portion 41 are connected together is provided on an axis A11 of the gate line G extending in the first direction X within the active area ACT. That is, the gate line G extends from the inside of the active area ACT to the first position P21 without bending.

On the other hand, in the example of FIG. 9, a second position P22 where the output line 30 and the second portion 42 are connected together is apart in the second direction Y from the first position P21 and is apart in the second direction Y from an axis A21 of the output line 30 which extends in the first direction X from the inside of the gate driver GD. Specifically, the second position P22 is apart from axis A21 toward the first edge 40*a* of the contact portion 40 (toward the upper side of FIG. 9). The output line 30 extends to the second portion 42 along axis A21 from the inside of the gate driver GD, bends counterclockwise at a third position P23 which is near the second portion 42 to form an acute angle with axis A21, and extends to the second position P22 again bending at a fourth position P24.

Even if the output line 30 is bent while the gate line G is unbent to separate the first position P21 from the second position P22 in the second direction Y as above, a position where a line continuously extending from the gate line G and the circuit line 20 cross can be separated from the crossing region CR. Therefore, even if ESD occurs on the line continuously extending from gate line G and the first insulating layer 11 is damaged by ESD, a malfunction such as a short-circuit between the circuit line 20 and the output line 30 does not easily occur.

Third Embodiment

The third embodiment is now explained. Unless otherwise specified, the structure and work of the embodiment are the same as those of the first embodiment.

Figure 10:
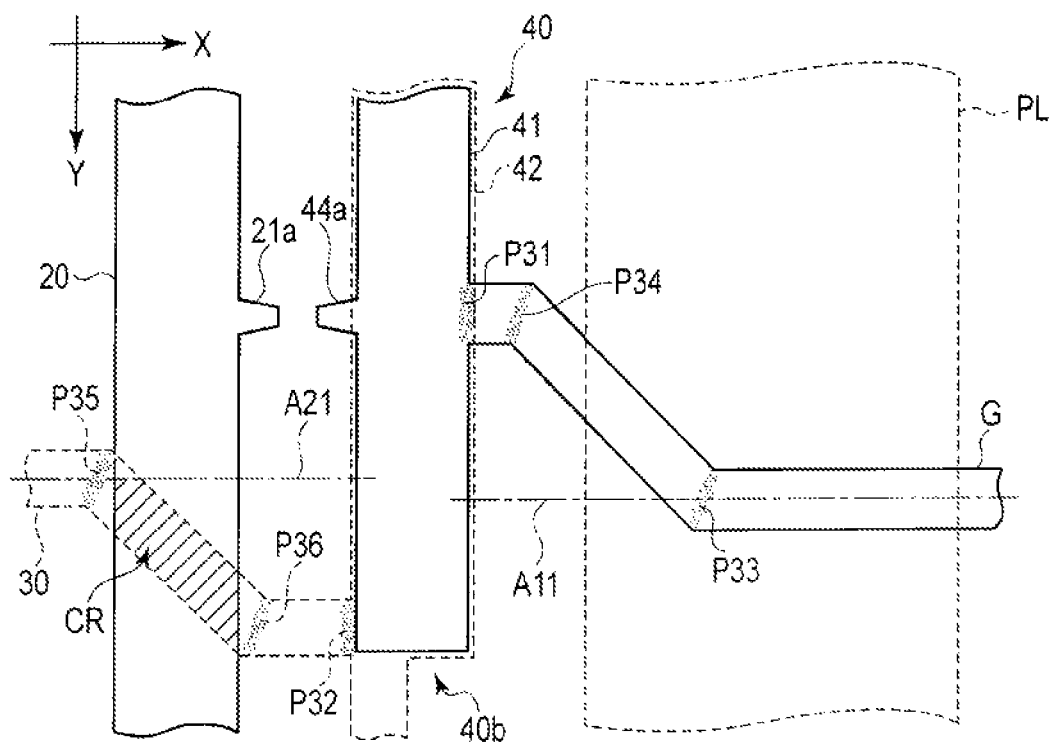
FIG. 10 shows a display device of a third embodiment.

FIG. 10 is a schematic view which shows a liquid crystal display device of the third embodiment and shows a joint part of a gate line G, output line 30, and contact portion 40 in an enlarged manner as in FIG. 4.

In the example of FIG. 10, a first position P31 where a gate line G and a first portion 41 are connected together is apart in the second direction Y from an axis A11 of the gate line G which extends in the first direction X within the active area ACT. Specifically, the first position P31 is apart from axis A11 toward a first edge 40a of a contact portion 40 (toward the upper side of FIG. 10). The gate line G extends from the active area ACT to the first portion 41 along axis A11, bends clockwise to form an acute angle with axis A11 at a third position P33 which is near the first portion 41, and extends to the first position P31 again bending at a fourth position P34.

On the other hand, in the example of FIG. 10, a second position P32 where the output line 30 and the second portion 42 are connected with each other is apart in the second direction Y from the first point P21, and is apart in the second direction Y from axis A21 of the output line 30 which extends in the first direction X inside the gate driver GD. Specifically, the second position P32 is apart from axis A21 toward the second edge 40b of the contact portion 40 (toward the lower side of FIG. 10). The output line 30 extends from the inside of the gate driver GD to the second portion 42 along axis A21, bends clockwise to form an acute angle with axis A21 at a fifth position P35 which is near the second portion 42, and extends to the second position P32 again bending at a sixth position P36.

Even if both the gate line G and the output line 30 are bent to separate the first position P21 from the second position P22 in the second direction Y as above, a position where a line continuously extending from the gate line G which is connected to the first portion 41 at the first position P31 and the circuit line 20 cross can be separated from the crossing region CR.

Therefore, even if ESD occurs therein and the first insulating layer 11 is damaged by ESD, a malfunction such as a short-circuit between the circuit line 20 and the output line 30 does not easily occur.

(Variations)

The structures of the first to third embodiments can be varied arbitrarily.

For example, the positions where the gate line G and the output line 30 are bent, the angle of bending, the number of bending points, and the positions and number of protrusions 21 and 44 are not limited to the examples depicted in FIGS. 4, 9 and 10.

Furthermore, if there can be maintained a sufficient gap in the second direction Y between axis A11 of the gate line G which extends in the first direction X inside the active area ACT and axis A21 of the output line 30 which extends in the first direction X inside the gate driver GD, the gate line G and the output line 30 may be connected to the first portion 41 and the second portion 42 without bending. Even if so, a position where the line continuously extending from the gate line G and the circuit line 20 cross can be separated from the crossing region CR, and a malfunction of the gate driver GD caused by ESD can be prevented.

Furthermore, the structures of FIGS. 4, 9 and 10 can be applied to various display devices including lines to drive pixels and a substrate on which a drive circuit used to supply driving signals to the lines, namely, an organic electroluminescence display device and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A display device comprising:
an array substrate including:
source lines arrayed in a first direction;
gate lines arrayed in a second direction intersecting the first direction;
a gate driver formed on the array substrate as an internal circuit;
an output line electrically connected to the gate driver;
a circuit line electrically connected to the gate driver;
a power supply line; and
an insulating layer having a first surface and a second surface opposed to the first surface, wherein
the gate driver is located at an outside of an active area which displays an image,
the circuit line extends linearly in the second direction,
the power supply line extends parallel to the circuit line and is located between the gate driver and the active area in the first direction,
the power supply line is located between the circuit line and the active area,
the output line is drawn from the gate driver to the active area, and is connected to one of the gate lines at a contact portion,
the contact portion extends linearly in the second direction and is parallel to the power supply line,
a part of the output line crosses the circuit line diagonally at a crossing region,
the output line has a first part, a second part, and a third part,
the first part and the third part extend in the first direction,
the second part is between the first part and the third part,
a first end of the second part is connected to the first part at a first position,
a second end of the second part is connected to the third part at a second position, the second part extends in a third direction which forms an acute angle with the first direction, the second part includes the part of the output line which crosses the circuit line at the crossing region, the first part, the second part, and the third part are in contact with the first surface of the insulating layer, and the circuit line is in contact with the second surface of the insulating layer.

2. The display device of claim 1, wherein the power supply line is in contact with the first surface of the insulating layer.

3. The display device of claim 2, wherein the circuit line is between the first position and the second position in the first direction.

4. The display device of claim 1, wherein a width in the first direction of the circuit line is smaller than a width in the first direction of the power supply line.

5. The display device of claim 4, wherein the first position is shifted in the first direction and in the second direction with the second position.

6. The display device of claim 5, wherein a distance from the first position to the second position in the second direction is larger than 10 µm.

7. The display device of claim 5, wherein the acute angle is larger than 30 degrees.

8. The display device of claim 5, further comprising pixel electrodes and a common electrode connected to the power supply line, wherein the common electrode, the gate lines, the source lines and the pixel electrodes are formed on the substrate in the display area, and the common electrode faces the pixel electrodes in a thickness direction of the substrate in the display area.

9. The display device of claim 1, wherein the first part, the second part and the third part are integrally formed of a same material.

10. The display device of claim 1, wherein the third part is between the contact portion and the second part, and is connected to the contact portion.

* * * * *